Patented July 8, 1941

2,248,458

UNITED STATES PATENT OFFICE 2,248,458

PARASITICIDE

William P. ter Horst, Packanack Lake, N. J., assignor to United States Rubber Company, New York, N. Y., a corporation of New Jersey No Drawing. Application July 15, 1939, Serial No. 284,710

17 Claims. (Cl. 167—24)

This invention relates to improvements in insecticidal, mothproofing and other parasiticidal preparations.

Derris root resin, a known insecticide, is generally prepared by extraction from derris root with a suitable solvent and subsequently removing the solvent, leaving the extracted material in the form of a resin containing approximately 25–35% of rotenone. It was imperative with these former processes that the solvents, such as chloroform or ethylene dichloride, be removed, since they are injurious to plant life. The extract has in the past ordinarily been suspended in water and used as a spray; and as such has a limited potency.

An object of the present invention is to prepare a parasiticidal preparation directly by extraction from derris root or other plant portions containing oil-soluble insect toxicant, which preparation without removal of the solvent has highly increased potency as an insecticide. Other objects will be apparent hereinafter.

According to the invention the plant portion, such as derris root, is extracted with an oily condensate produced by reacting an alkylene halide with an aromatic hydrocarbon compound having at least one and not more than two of the nuclear hydrogen atoms replaced by halogen. Preferred condensates for the purpose are the products obtainable by reacting ethylene dichloride with chlorbenzol, and ethylene dichloride with chlor-toluene. The reaction is preferably carried out using equi-molecular proportions of the reagents in the presence of a condensing agent or catalyst of the Friedel-Crafts type, such as aluminum chloride or boron trifluoride. The oily condensates inherently have parasiticidal properties.

The following example illustrates the preparation of the condensate:

*Example 1.*—A mixture of 2130 parts of ethylene chloride and 1915 parts of monochlor-benzol is cooled to 30° C. 180 parts of anhydrous powdered aluminum chloride are added with agitation, and the temperature is slowly raised to 38° C. and kept there for six hours. The reaction time and the temperature may be varied according to the "activity" of the aluminum chloride used. Hydrochloric acid gas is evolved and may be absorbed in a suitable medium. At the end of approximately six hours, the mixture is cooled to 30° C. and water is added to stop the reaction before resinification. Approximately 2000 parts of water are used. The oily lower layer is separated and filtered. Unreacted ethylene chloride and chlorbenzol are removed by distillation. Approximately 1200 parts of crude reaction product remain, 89% of which can be vacuum distilled at 250–350° C. at 50 mm. Hg pressure. The distilled oil so obtained contains 27% chlorine, has a specific gravity of 1.202, a refractive index of 1.5907, and a viscosity of 17.5 centipoises.

Other alkylene halides may be used, for example, propylene chloride, amylene chloride, etc.; and other aromatic compounds may be used, for example chlor toluol, chlor diphenyl, chlor xylol, chlor ethyl-benzol, chlor naphthalene, dichlor benzol, etc.

Instead of derris, other organic toxicants may be treated in a similar manner, for example cubé, timbo, devil's shoestrings, Pyrethrum, and the like.

A suitable preparation giving high mortality on black bean aphids (*Aphis rumicis*) is a solution of 20% by weight of derris resinate containing about 35% rotenone, dissolved in the oily condensate of the above example, and the solution emulsified in approximately two and a half times its weight of water with the aid of any suitable emulsifying agent, for example, "Emulphor A" (a product supplied by the General Dyestuff Corporation). One part of the emulsion of the above solution to 800 parts by weight of water yielded 90–100% mortality when sprayed upon the black bean aphids. Equally effective mortality was the result when the emulsion was sprayed on Mexican bean beetles, Colorado potato beetles, etc. It has been found to be effective as a stomach insecticide, a contact insecticide and an insect repellent for various insects including flea beetles, clothes moths and carpet beetles.

If desired, other auxiliary ingredients may be added, such as mineral oils, glycerides, wetting agents, spreading agents, sticking agents, or stabilizing agents for the extracted toxicant where the preparation is to be used as a repellent or as a stomach poison, since in the latter case permanence of the effectiveness of the toxicant is important.

Having thus described my invention, what I claim and desire to protect by Letters Patent is:

1. A parasiticidal preparation containing as active ingredients an organic oil-soluble toxicant derived from a plant in solution in an oily product of condensation of an alkylene dihalide with an aromatic hydrocarbon compound having at least one and not more than two nuclear hydrogen atoms replaced by halogen.

2. A parasiticidal preparation containing as active ingredients an organic oil-soluble toxicant in solution in an oily product of condensation of an alkylene dichloride with an aromatic hydrocarbon compound having at least one and not more than two nuclear hydrogen atoms replaced by chlorine.

3. An insecticidal preparation containing as active ingredients rotenone in solution in an oily product of condensation of an alkylene dichloride with an aromatic hydrocarbon of the benzene series having one of its nuclear hydrogen atoms replaced by chlorine.

4. An insecticidal preparation containing as active ingredients rotenone in solution in an oily product of condensation of an ethylene dichloride with an aromatic hydrocarbon of the benzene series having one of its nuclear hydrogen atoms replaced by chlorine.

5. An insecticidal preparation containing as active ingredients rotenone in solution in an oily product of condensation of an ethylene dichloride with chlor benzol having one of its nuclear hydrogen atoms replaced by chlorine.

6. An insecticidal preparation containing as active ingredients rotenone in solution in an oily product of condensation of an ethylene dichloride with chlor toluene having one of its nuclear hydrogen atoms replaced by chlorine.

7. A process for preparing a parasiticidal preparation which comprises extracting oil-soluble toxicants from a toxicant-containing plant with an oily product of condensation of an alkylene dihalide with an aromatic hydrocarbon compound having at least one and not more than two nuclear hydrogen atoms replaced by halogen.

8. An insecticidal preparation containing as active ingredients rotenone in solution in an oily product of condensation of an alkylene dichloride with an aromatic hydrocarbon of the benzene series having at least one and not more than two of its nuclear hydrogen atoms replaced by chlorine.

9. An insecticidal preparation containing as active ingredients rotenone in solution in an oily product of condensation of an ethylene dichloride with an aromatic hydrocarbon of the benzene series having at least one and not more than two of its nuclear hydrogen atoms replaced by chlorine.

10. An insecticidal preparation containing as active ingredients rotenone in solution in an oily product of condensation of an ethylene dichloride with chlor benzol having at least one and not more than two of its nuclear hydrogen atoms replaced by chlorine.

11. An insecticidal preparation containing as active ingredients rotenone in solution in an oily product of condensation of an ethylene chloride with chlor toluene having at least one and not more than two of its nuclear hydrogen atoms replaced by chlorine.

12. A parasiticidal preparation containing as active ingredients an organic toxicant derived from derris plant in solution in an oily product of condensation of an alkylene dihalide with an aromatic hydrocarbon compound having at least one and not more than two nuclear hydrogen atoms replaced by halogen.

13. A parasiticidal preparation containing as active ingredients an organic toxicant derived from derris plant in solution in an oily product of condensation of an alkylene dichloride with an aromatic hydrocarbon compound having at least one and not more than two nuclear hydrogen atoms replaced by chlorine.

14. An insecticidal preparation containing as active ingredients an organic toxicant derived from derris plant in solution in an oily product of condensation of an alkylene dichloride with an aromatic hydrocarbon of the benzene series having one of its nuclear hydrogen atoms replaced by chlorine.

15. An insecticidal preparation containing as active ingredients an organic toxicant derived from derris plant in solution in an oily product of condensation of an ethylene dichloride with an aromatic hydrocarbon of the benzene series having one of its nuclear hydrogen atoms replaced by chlorine.

16. An insecticidal preparation containing as active ingredients an organic toxicant derived from derris plant in solution in an oily product of condensation of an ethylene dichloride with chlor benzol having one of its nuclear hydrogen atoms replaced by chlorine.

17. An insecticidal preparation containing as active ingredients an organic toxicant derived from derris plant in solution in an oily product of condensation of an ethylene dichloride with chlor toluene having one of its nuclear hydrogen atoms replaced by chlorine.

WILLIAM P. TER HORST.